United States Patent
Nakano et al.

(10) Patent No.: US 8,792,703 B2
(45) Date of Patent: Jul. 29, 2014

(54) METHOD FOR TRACKING CELLS

(75) Inventors: Mitsuhiro Nakano, Tokyo (JP); Kosuke Takagi, Tokyo (JP)

(73) Assignee: Olympus Corporation, Tokyo (JP)

(*) Notice: Subject to any disclaimer, the term of this patent is extended or adjusted under 35 U.S.C. 154(b) by 61 days.

(21) Appl. No.: 13/423,510

(22) Filed: Mar. 19, 2012

(65) Prior Publication Data

US 2012/0243767 A1 Sep. 27, 2012

(30) Foreign Application Priority Data

Mar. 23, 2011 (JP) ................................ 2011-064989

(51) Int. Cl.
*G06K 9/00* (2006.01)
*G01N 33/554* (2006.01)

(52) U.S. Cl.
USPC .......................................... 382/133; 436/519

(58) Field of Classification Search
USPC ......... 382/128–134; 435/7.23, 41, 70.1, 70.4, 435/440, 449; 436/519, 520, 522; 600/352, 600/562
See application file for complete search history.

(56) References Cited

U.S. PATENT DOCUMENTS

| 7,050,620 B2 * | 5/2006 | Heckman ...................... 382/133 |
| 2006/0127881 A1 * | 6/2006 | Wong et al. ...................... 435/4 |
| 2010/0046823 A1 | 2/2010 | O Ruanaidh et al. |

FOREIGN PATENT DOCUMENTS

| JP | 2007-222073 A | 9/2007 |
| WO | 2008/100704 A2 | 8/2008 |

OTHER PUBLICATIONS

Extended European Search Report (EESR) dated Jun. 5, 2012 (in English) in counterpart European Application.

\* cited by examiner

*Primary Examiner* — Abolfazl Tabatabai
(74) *Attorney, Agent, or Firm* — Holtz Holtz Goodman & Chick PC

(57) ABSTRACT

Simple, high-precision cell tracking is realized. Provided is a method for tracking cells, comprising an image acquisition step (S1) of acquiring a plurality of observation images including a plurality of cells in the field of view at certain time intervals; a feature analysis step (S2) of analyzing predetermined brightnesses of the individual cells in the observation images acquired in the image acquisition step (S1); a grouping step (S3) of grouping the cells for each of the observation images on the basis of the brightnesses analyzed in the feature analysis step (S2) and a predetermined threshold value for classifying the brightnesses; and an associating step (S4) of associating, for each of the groups divided in the grouping step (S3), the cells whose morphological features are substantially the same between the observation images acquired at different times.

5 Claims, 9 Drawing Sheets

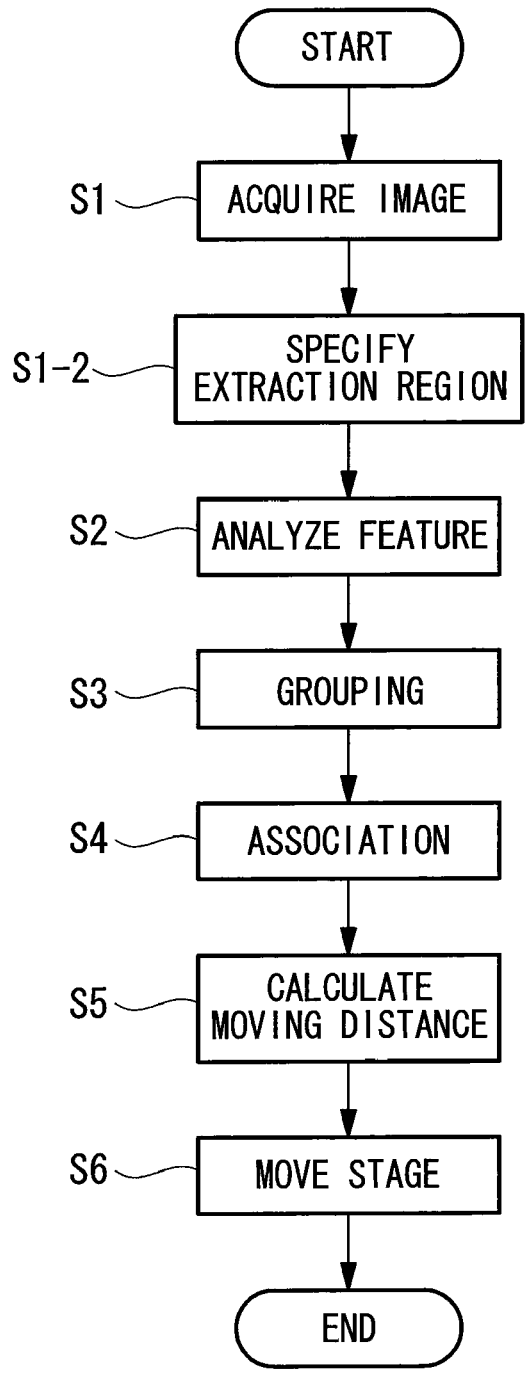

METHOD FOR TRACKING CELLS

This application is based on Japanese Patent Application No. 2011-064989, the contents of which are incorporated herein by reference.

TECHNICAL FIELD

The present invention relates to a method for tracking cells.

BACKGROUND ART

There is a known method in the related art for tracking specific cells to observe time-series changes of the form (shape, brightness, etc.) and the dynamic characteristics of cells contained in biological tissue (for example, refer to PTL 1). The method for tracking cells disclosed in PTL 1 is designed to track cells by processing images of cells acquired at certain time intervals to extract the outlines of the cells, and performing matching of the cells in the images acquired at different times to obtain the moving distances and the rotation angles thereof.

CITATION LIST

Patent Literature

{PTL 1} Japanese Unexamined Patent Application, Publication No. 2007-222073

SUMMARY OF INVENTION

Technical Problem

However, the method for tracking cells disclosed in PTL 1 has a problem in that, although the individual cells can be tracked if the shapes of the cells do not change or if the brightnesses of the cells are uniform, if the shapes of the cells change, the identity of the cells cannot be determined before and after the change, or if the brightnesses of the cells are nonuniform, some can be detected but the others cannot be detected depending on the brightnesses of the cells, and thus, the cells cannot be precisely tracked.

The present invention has been made in consideration of the circumstances described above, and an object thereof is to provide a method for tracking cells that is capable of achieving simple, high-precision cell tracking.

Solution to Problem

The present invention adopts the following solutions to achieve the above object.

An aspect of the present invention is a method for tracking cells, comprising an image acquisition step of acquiring a plurality of observation images including a plurality of cells in a field of view at certain time intervals; a feature analysis step of analyzing predetermined features of the individual cells in the observation images acquired in the image acquisition step; a grouping step of grouping the cells for each of the observation images on the basis of the features analyzed in the feature analysis step and a predetermined threshold value for classifying the features; and an associating step of associating, for each of the groups divided in the grouping step, the cells whose morphological features are substantially the same between the observation images acquired at different times.

According to the above aspect, by dividing the cells into a plurality of groups for each of the observation images acquired at certain time intervals on the basis of a predetermined feature and a predetermined threshold value in the grouping step, cells having substantially the same morphological feature in the observation images can be associated with each other in units of groups in the associating step. Thus, even if a plurality of cells having different features are mixed in each observation image, a tracking target cell can easily be identified. Accordingly, time-series changes of a desired cell can be tracked simply and precisely. Examples of the morphological feature include the brightness of the cell, the size of the cell, the shape of the cell, and the wavelength of the cell.

In the above aspect, the feature may include at least one of the brightness of the cell, the size of the cell, the shape of the cell, and the wavelength of the cell.

This configuration allows the cells to be efficiently grouped depending on the characteristics of the cells, making it easy to identify cells to be associated. For example, grouping the cells on the basis of a feature that is less prone to change with time makes it easy to associate the same one cell after a lapse of a predetermined time In the above aspect, in the grouping step, the cells may be grouped focusing on a feature in a partial region of the cell.

With this configuration, even if the cells each have a plurality of regions having different features, the cells in the individual observation images can be associated with each other using only the feature of a predetermined region.

For example, in the case where the cells each have a main portion that has slightly changed in shape, brightness, or the like and a protruding portion that has greatly changed, the cells can be precisely associated with each other using only the feature of the main portion. Furthermore, for example, in the case where the cells each have a region where the cells are entangled in a complicated manner, like nerve cells, the cells can be individually associated with each other on the basis of a feature of only a region where the cells are not entangled.

In the above aspect, the method may further include a region defining step of defining a region of interest including the tracking target cell in the observation image; a moving-distance calculating step of calculating the moving distance of the cell associated in the associating step; and a moving step of moving the region of interest defined in the region defining step together with the cell for each of the observation images on the basis of the moving distance of the cell calculated in the moving-distance calculating step.

This configuration allows a tracking target cell to be distinguished from the other cells using the region of interest. In this case, by moving the region of interest with the cell for each of the observation images, the tracking target cell in each observation image can easily be found and tracked even if the field of view or a stage on which the cells are placed is not moved.

In the above aspect, the method may further include a moving-distance calculating step of calculating the moving distance of the cell associated in the associating step; and a moving step of moving the field of view or a stage on which the cell is placed in a direction opposite to the moving direction of the cell for each of the observation images on the basis of the moving distance of the cell calculated in the moving-distance calculating step.

This configuration allows a tracking target cell to be tracked in each of the observation images, with the tracking target cell placed at a desired position in the field of view.

Advantageous Effects of Invention

The present invention provides the advantage that simple, high-precision cell tracking can be achieved.

BRIEF DESCRIPTION OF DRAWINGS

FIG. 12 is a flowchart of a method for tracking cells according to a modification of an embodiment of the present invention.

DESCRIPTION OF EMBODIMENTS

A method for tracking cells according to an embodiment of the present invention will be described hereinbelow with reference to the drawings.

Figure 1:
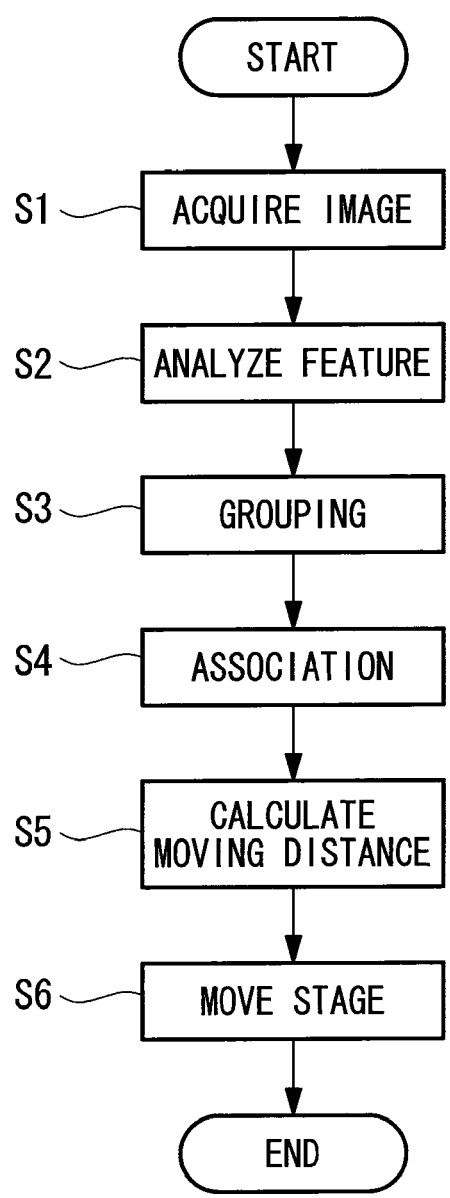
FIG. 1 is a flowchart of a method for tracking cells according to an embodiment of the present invention.

As shown in the flowchart in FIG. 1, the method for tracking cells according to this embodiment includes an image acquisition step S1 of acquiring observation images of a plurality of cells at certain time intervals, a feature analysis step S2 of analyzing predetermined features of the individual cells in the observation images acquired in the image acquisition step S1, a grouping step S3 of grouping the cells in each of the observation images on the basis of the features analyzed in the feature analysis step S2, an associating step S4 of associating the same one cell in the individual observation images for each of the groups classified in the grouping step S3, a moving-distance calculating step S5 of calculating the moving distance of the cells associated in the associating step S4, and a moving step S6 of moving a stage on which the cells are placed on the basis of the moving distance calculated in the moving-distance calculating step S5.

In the image acquisition step S1, observation images are acquired so that a plurality of the same cells are included in the field of view. In the observation images acquired in the image acquisition step S1, regions having a brightness higher than a predetermined threshold value are regarded as cells by brightness analysis. The threshold value for extracting cells is set to, for example, a value lower than the brightness values of all the cells in the observation images.

In the feature analysis step S2, features, such as the brightnesses of the individual cells, the sizes of the individual cells, the shapes of the individual cells, or the wavelengths of the individual cells, are analyzed for each of the observation images, and the analyzed features are stored in association with the individual cells. A preferable feature differs from one cell to another and is less prone to change with time. For example, if cell brightness is used as a feature, values obtained when cells in each observation image are detected can be used.

In the grouping step S3, individual cells in each observation image are classified into a plurality of groups on the basis of brightnesses (feature) associated with the individual cells and a predetermined threshold value of brightness for grouping. In the grouping of cells, the cells are divided into the same number of groups in all of the observation images using the same threshold value. For example, the cells may be divided into two groups using one threshold value or may be divided into three or more groups using a plurality of threshold values, depending on the number of cells in the observation images.

In the associating step S4, only cells in one of the groups in each observation image are extracted. In the extracted group, cells having substantially the same morphological features between observation images acquired at different times are associated with one another.

Examples of the morphological features are the brightness of the cell, the size of the cell, the shape of the cell, or the wavelength of the cell; features analyzed in the feature analysis step S2 and associated with the cell can be used. In the case where the morphological features of cells in the same group differ, the same feature as a feature used for grouping may also be used as a morphological feature for association.

In the moving-distance calculating step S5, for example, the coordinates of the center of gravity of each observation image of associated cells are detected, and the moving distance of the cell is calculated from the difference between the detected coordinates.

In the moving step S6, the stage is moved for each observation image in a direction opposite to the moving direction of the cells by the same amount as the moving distance of the cells. The stage is set so that, for example, the cells to be tracked are placed substantially at the center of the field of view.

The operation of the thus-configured method for tracking cells will be described hereinbelow.

To track cells with the cell tracking method according to this embodiment, first, an observation image at time T including a plurality of cells in the field of view is acquired (step S1).

Figure 2:
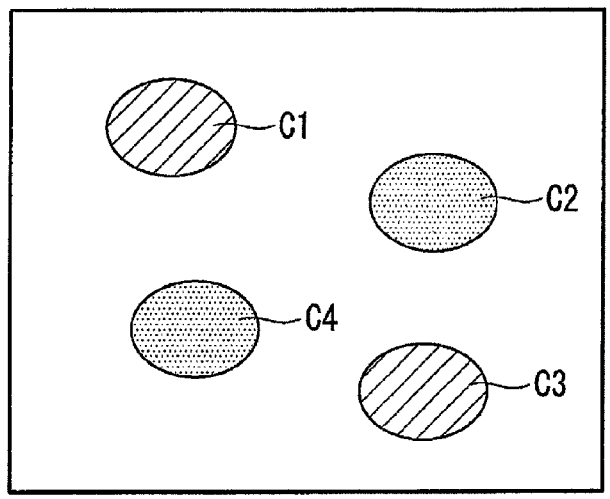
FIG. 2 is a diagram illustrating cells in an observation image.

After the observation image at time T is acquired, the cells in the observation image are detected by brightness analysis using a brightness threshold value for detecting cells. For example, as shown in FIG. 2, suppose that four cells C (hereinafter the individual cells are denoted by signs C1, C2, C3, and C4) having different brightnesses are detected in the observation image at time T. Subsequently, features of the individual cells C in the observation image, such as the size, shape, and wavelength, are analyzed, and these features, including the brightness, are stored in association with the individual cells C1, C2, C3, and C4 (step S2).

Figure 3:
FIG. 3 is a diagram illustrating cells in a light group and cells in a dark group.

Next, as shown FIG. 3, the four cells C1, C2, C3, and C4 are classified into a light group (for example, the cells C1 and C3) having a brightness equal to or higher than a threshold value of brightness for grouping and a dark group (for example, the cells C2 and C4) having a brightness lower than the threshold value on the basis of brightnesses (feature) associated with the individual cells C and the threshold value (step S3).

Similarly, steps S1 to S3 are repeated also for time T+1.

Figure 4:
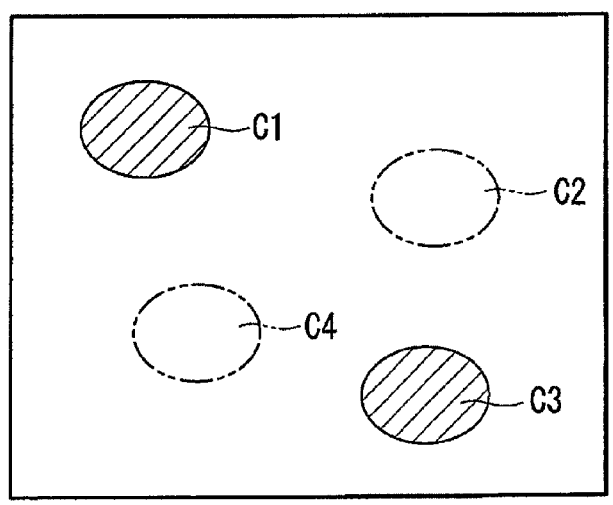
FIG. 4 is a diagram illustrating a state in which only the cells in the light group are extracted in an observation image at time T.
Figure 5:
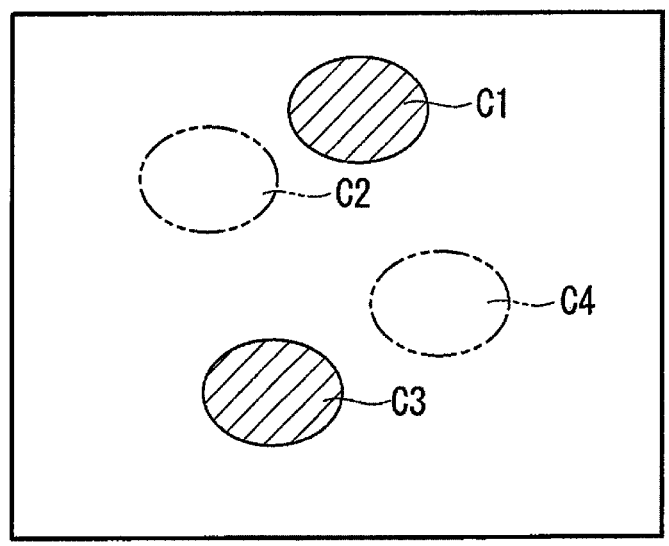
FIG. 5 is a diagram illustrating a state in which only the cells in the light group are extracted in an observation image at time T+1.

Subsequently, only the cells C1 and C3 in the light group in the observation image at time T are extracted by binarization, as shown in FIG. 4, and only the cells C1 and C3 in the light group also in the observation image at time T+1 are extracted, as shown in FIG. 5.

Figure 6:
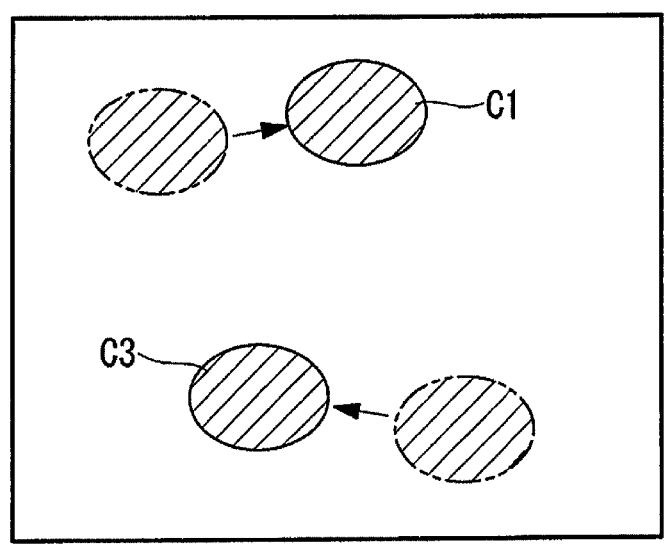
FIG. 6 is a diagram illustrating a state in which one cell in the light group is associated with the same cell between observation images.

The observation image at time T and the observation image at time T+1 are compared, and as shown in FIG. 6, the cells C1 and the cells C3 whose brightnesses (morphological features), which are related in advance, are substantially the same are associated with each other between these observation images (step S4). This makes it easy to ascertain where in the observation image at time T+1 the cells C1 and C3 in the observation image at time T have moved.

Next, the coordinates of the center of gravity of the tracking target cell C1 are detected for each of the observation images, and the moving distance of the cell C1 is calculated (step S5). After the moving distance of the cell C1 is calculated, the stage is moved in the direction opposite to the moving direction of the cell C1 from the observation image at time T by the same amount as the moving distance of the cell C1 in the observation image at time T+1 (step S6). This allows the movement of the cell C1 to be tracked also in the observation image at time T+1, with the cell C1 kept substantially at the center of the field of view.

With the method for tracking cells according to this embodiment, by dividing the four cells C1, C2, C3, and C4 into two groups for each of the observation images acquired at certain time intervals on the basis of the brightnesses (feature) of the cells C and the threshold value for grouping in the grouping step S3, the cells C1 having substantially the same brightness (morphological feature) in the observation images can be associated with each other in units of groups in the associating step S4.

Thus, even if the plurality of cells C1, C2, C3, and C4 having different brightnesses (features) are mixed in each observation image, the tracking target cell C1 can easily be identified. Accordingly, time-series changes of the cell C1 can be tracked simply and precisely.

In this embodiment, although the cells C1 and the cells C3 in the light group are individually associated with each other in the associating step S4, the cells C2 and the cells C4 in the dark group may be individually associated with each other in the same way.

Furthermore, although this embodiment has been described using the brightness, size, shape, and wavelength of the cell C as examples of the features of the cell C, any feature that can distinguish the tracking target cell C1 from the other cells C2, C3 and C4 can be used. Although the brightness of the cell C is used as a feature for grouping, at least one of the brightness, size, shape, and wavelength may be included.

Furthermore, in this embodiment, the brightness of the cell C is used both as a feature for grouping and a morphological feature for association on the precondition that the cells C1 and C3 classified into the same group have different brightnesses (morphological features); however, for example, in the case where the brightnesses (morphological features) of the cells C1 and C3 in the same group are substantially the same, the size of the cell C, the shape of the cell C, the wavelength of the cell C, or the like may be used as a morphological feature for association.

Furthermore, in this embodiment, although the observation images are binarized, the cells C1 and C3 in one group need only be distinguished from the cells C2 and C4 in another group; for example, the cells C1 and C3 or the cells C2 and C4 in each image may be displayed in different colors, or the cells C1 and C3 or the cells C2 and C4 in each image may be marked.

Figure 7:
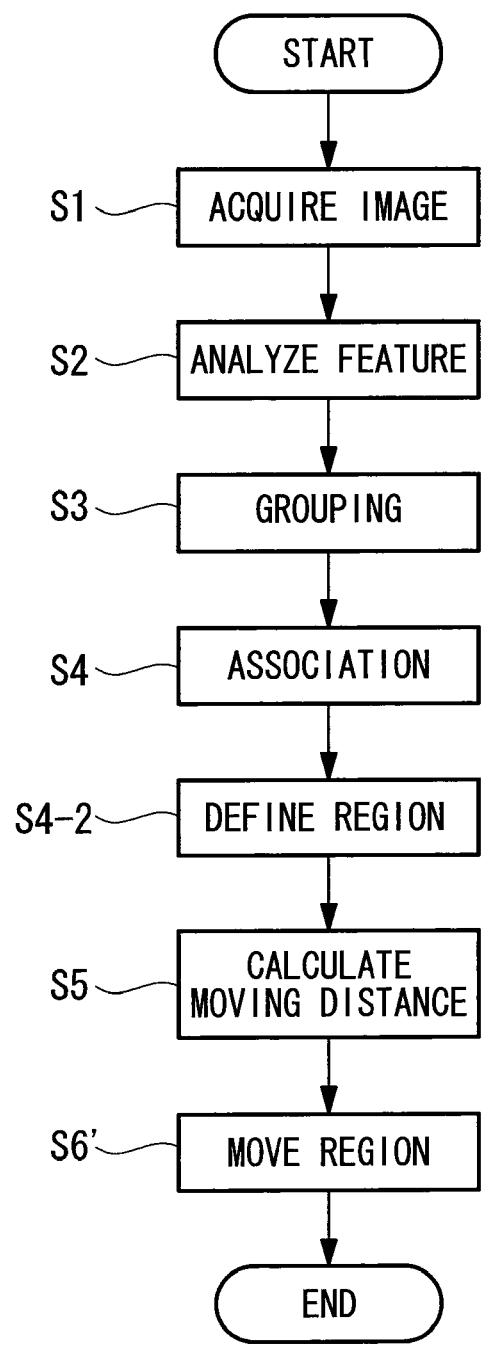
FIG. 7 is another flowchart of a method for tracking cells according to an embodiment of the present invention.

Furthermore, in this embodiment, the cell C1 is tracked by moving the stage; instead, for example, the field of view of each observation image including the cell C1 may be moved. Rather than moving the stage or the field of view, the present invention may include, for example, a region defining step S4-2 of defining a region including the tracking target cell C1 (hereinafter referred to as "region of interest", not shown) in the observation image, as shown in the flowchart of FIG. 7. Then, in a moving step S6', the region of interest defined in each observation image may be moved together with the cell C1 in each observation image on the basis of the moving distance of the cell C1 calculated in the moving-distance calculating step S5. The region of interest is preferably displayed, for example, in different colors or using a boundary, so as to be distinguished from the other region in the observation image.

This allows the tracking target cell C1 to be distinguished from the other cells C2, C3, and C4 using the region of interest in the observation image. Furthermore, by moving the region of interest with the movement of the cell C1 for each observation image, the tracking target cell C1 in each observation image can easily be found and tracked even if the field of view or the stage on which the cells C are placed is not moved.

Figure 8:
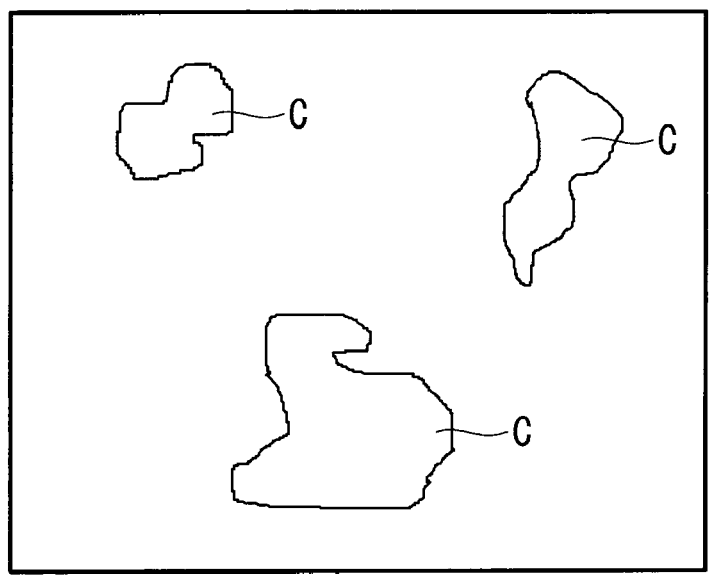
FIG. 8 is another diagram illustrating cells in an observation image.
Figure 9:
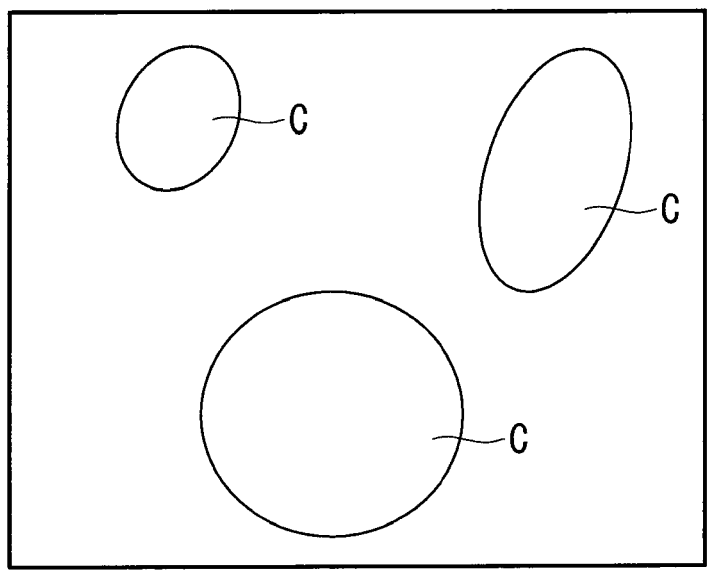
FIG. 9 is a diagram illustrating an observation image after the cells in FIG. 8 are extracted.
Figure 10:
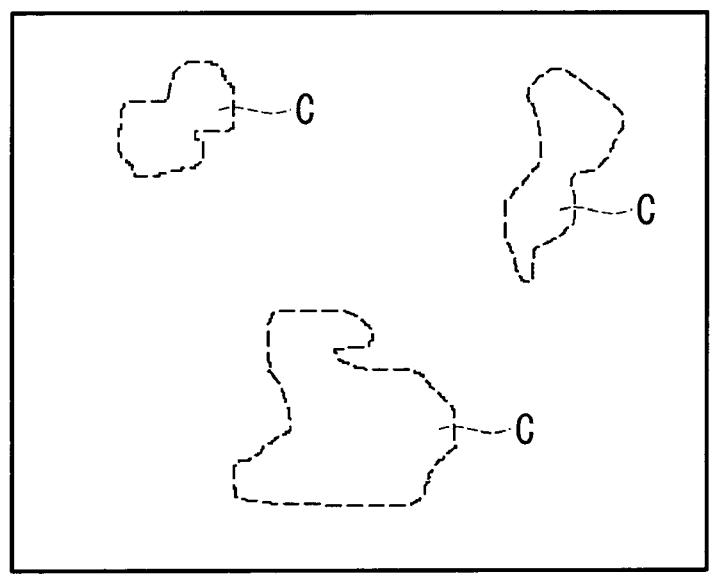
FIG. 10 is a diagram illustrating a state in which the outlines of the cells in the observation image in FIG. 9 are extracted.

Furthermore, in this embodiment, in the case where the detailed shapes of the cells C in each observation image extracted in the associating step S4 are damaged, as shown in FIG. 9, as compared with the observation image before the cells C are extracted, as shown in FIG. 8, the outlines of the cells C may be extracted after the moving-distance calculating step S5, as shown in FIG. 10. An example of the method for extracting the outlines is the Snake method.

Figure 11A:
FIG. 11A is a diagram illustrating a cell in an observation image.
Figure 11B:
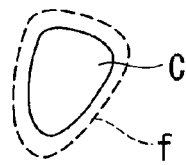
FIG. 11B is a diagram illustrating a state in which the cell in FIG. 11A is enclosed by a dotted frame.
Figure 11C:
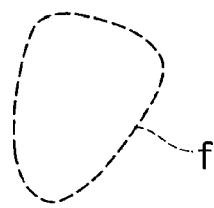
FIG. 11C is a diagram illustrating one of the candidates of the shape of the dotted frame in FIG. 11B.
Figure 11D:
FIG. 11D is a diagram illustrating another one of the candidates of the shape of the dotted frame in FIG. 11B.
Figure 11E:
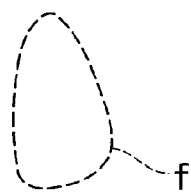
FIG. 11E is a diagram illustrating another one of the candidates of the shape of the dotted frame in FIG. 11B.
Figure 11F:
FIG. 11F is a diagram illustrating another one of the candidates of the shape of the dotted frame in FIG. 11B.
Figure 11G:
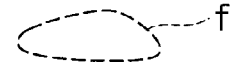
FIG. 11G is a diagram illustrating another one of the candidates of the shape of the dotted frame in FIG. 11B.

In this case, for example, the periphery of the cell C, as in the form shown in FIG. 11A, extracted in the observation image in the associating step S4 may be enclosed by a dotted frame f, as shown in FIG. 11B. Next, candidates, as shown in FIGS. 11C to 11G, may be sought while the dotted frame f is being expanded and contracted, and a value defined by the dotted frame f may be calculated. For example, a candidate of the dotted frame f, shown in FIG. 11F, may be determined, and a closed curve in the dotted frame f, that is, the outline of the cell C, may be found.

In this embodiment, since the appearances of the cells C are known to a certain extent, the outlines of the cells C can be detected without the need for complicated calculation even if the Snake method is used. This allows the forms of the tracking target cells C (for example, areas, perimeter lengths, and volumes) to be analyzed, and changes in the sizes and brightnesses of the cells C to be analyzed.

This embodiment can be modified as follows.

In this embodiment, although the cells C are grouped focusing on the features of the whole of the cells C, the cell may be grouped with attention to features in a partial area of the cell.

In this case, as shown in the flowchart in FIG. 12, a partial region of each cell in the observation images acquired in the image acquisition step S1 may be specified (step S1-2). The features may be analyzed only for the specified regions (step S2), and the specified regions may be grouped (step S3) and associated with each other (step S4).

Figure 13A:
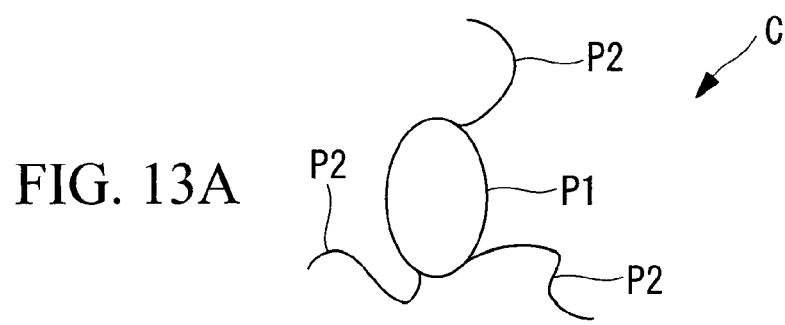
FIG. 13A is a diagram illustrating a cell in an observation image.
Figure 13B:
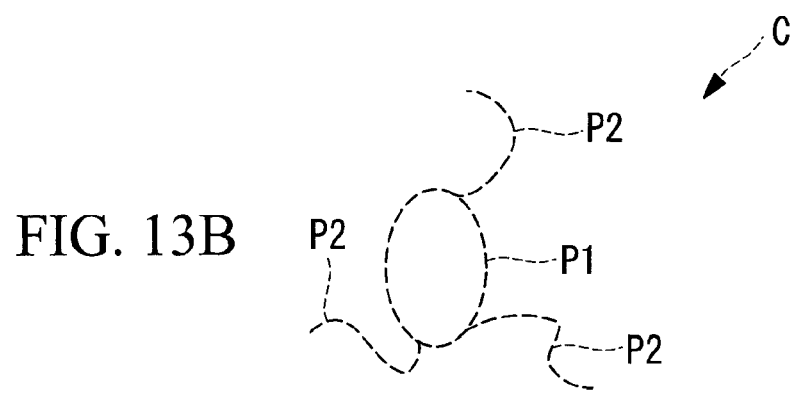
FIG. 13B is a diagram illustrating a cell that is displayed after being binarized.

Specifically, to track cells with the cell tracking method according to this modification, after an observation image of cells at time T has been acquired (step S1), a cell C having a main portion P1 that has slightly changed in shape, brightness, or the like, and protruding portions P2 that have greatly changed in shape, brightness, or the like, as shown in FIG. 13A, is detected by analyzing the brightness. Then, the observation image is binarized using a threshold value for detecting cells, and the main portion P1 and the protruding portions P2 of the cell C are displayed, as shown in FIG. 13B.

Figure 13C:
FIG. 13C is a diagram illustrating a state in which only a main portion of the cell in FIG. 13B is extracted.
Figure 13D:
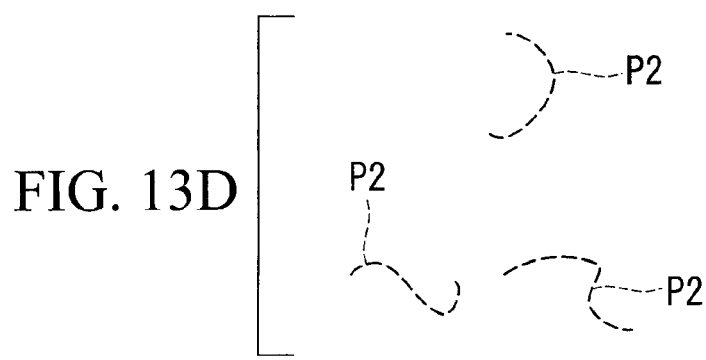
FIG. 13D is a diagram illustrating a state in which only protruding portions of the cell in FIG. 13B are extracted.

Subsequently, the main portion P1 is specified as a region of the cell C to be extracted (step S1-2). The features of the main portion P1 are analyzed (step S2), and the brightness, size, shape, and so on (features) of the main portion P1 shown in FIG. 13C are stored in association with the cell C. Also the shape etc. (features) of the protruding portions P2 shown in FIG. 13D, which are not extracted, may be stored in association with the cell C.

Next, the plurality of cells C in the individual observation images are grouped on the basis of the shape (feature) of the main portion P1 and the threshold value of the shape for grouping (step S3). Steps S1 to S3 are repeated also for time T+1. Only the main portions P1 of cells C in one group are extracted from the observation images at time T and time T+1, and main portions P1 whose brightnesses, sizes, and shapes (morphological features), which are related in advance, are substantially the same are associated with each other between these observation images (step S4).

This makes it easy to ascertain where in the observation image at time T+1 the cells C in the observation image at time T have moved. Then, the moving distances of the main portions P1 of the cells C may be calculated in step S5, and the stage may be moved in step S6.

According to this modification, even if the cells C each have the main portion P1 and the protruding portion P2 having different features, the cells C in the individual observation images can be precisely associated with each other using only the feature of the main portion P1. Furthermore, even if the protruding portion P2 of one cell C is entangled in a complicated manner with the protruding portion P2 of another cell C, it is possible to individually track only the cells C in association with each other on the basis of the features of the main portion P1. This modification is advantageous for tracking cells having complicated shapes, like nerve cells.

In this modification, the outlines of the protruding portions P2 may be extracted in addition to the outlines of the associated main portions P1. The main portion P1 and the protruding portion P2 may be combined in an observation image after tracking, so that the protruding portion P2 is brought back to the main portion P1. This allows a tracked cell C having the shape in which the protruding portion P2 is included in the main portion P1 to be analyzed or the like in detail also in an observation image after a lapse of a predetermined time.

REFERENCE SIGNS LIST

S1 image acquisition step
S2 feature analysis step
S3 grouping step
S4 associating step
S4-2 region defining step
S5 moving-distance calculating step
S6, S6' moving step

The invention claimed is:

1. A method for tracking cells, comprising:
   acquiring a plurality of observation images including a plurality of cells in a field of view at certain time intervals;
   detecting cells in the acquired observation images using a first threshold value;
   analyzing predetermined features of individual cells among the detected cells, the predetermined features including at least wavelength information of the individual cells;
   grouping the cells for each of the observation images into a plurality of groups, based on the analyzed features and a second threshold value for classifying the features;
   extracting only cells in a specific group from among the plurality of groups, for each of the observation images, the specific group being the same in each of the observation images; and
   associating cells with each other, from among the extracted cells, whose morphological features are substantially the same between the observation images acquired at different times.

2. The method for tracking cells according to claim 1, wherein the predetermined features further include at least one of a brightness of the cells, a size of the cells, and a shape of the cell cells.

3. The method for tracking cells according to claim 1, wherein, in the grouping, the cells are grouped based on a feature in a partial region of the cells.

4. The method for tracking cells according to claim 1, further comprising:
   defining a region of interest including a tracking target cell in the observation images;
   calculating a moving distance of the tracking target cell, the tracking target cell being one of the extracted cells associated between the observation images; and
   moving the defined region of interest together with the tracking target cell for each of the observation images, based on the calculated moving distance of the tracking target cell.

5. The method for tracking cells according to claim 1, further comprising:
   calculating a moving distance of a tracking target cell, the tracking target cell being one of the extracted cells associated between the observation images; and
   moving the field of view or a stage on which the cells are placed in a direction opposite to a moving direction of the tracking target cell for each of the observation images, based on the calculated moving distance of the tracking target cell.

* * * * *